F. M. WILSON.
CHEESE CUTTER.
APPLICATION FILED DEC. 16, 1912.
1,160,026.
Patented Nov. 9, 1915.
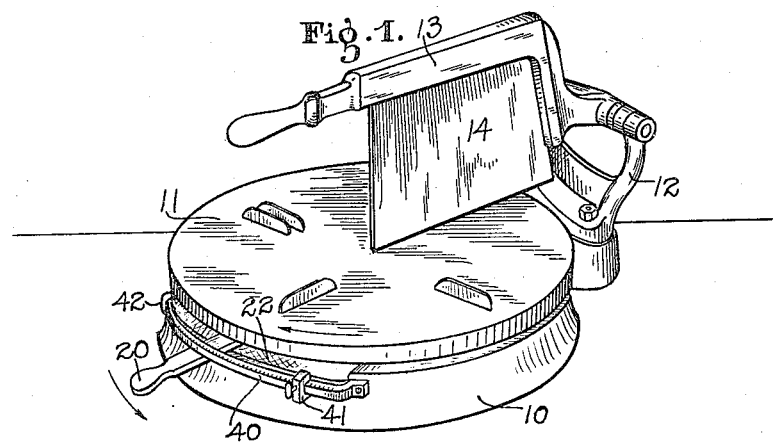
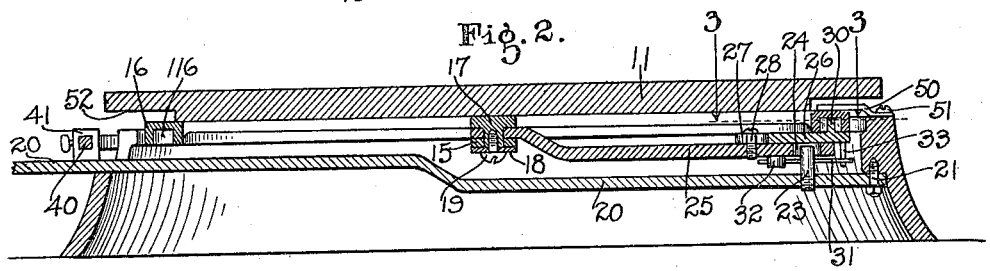
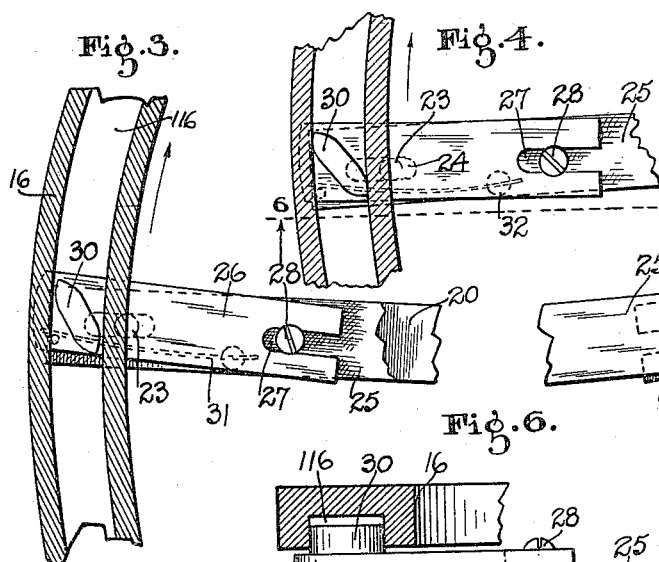
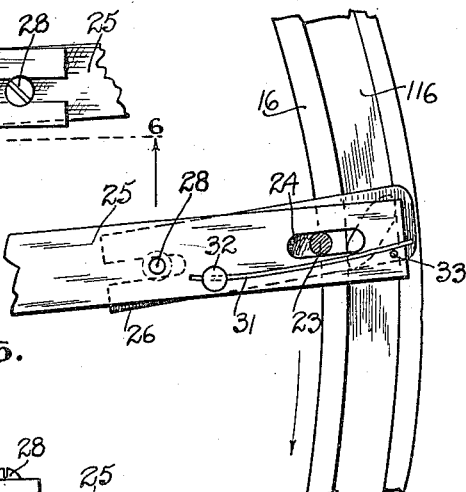
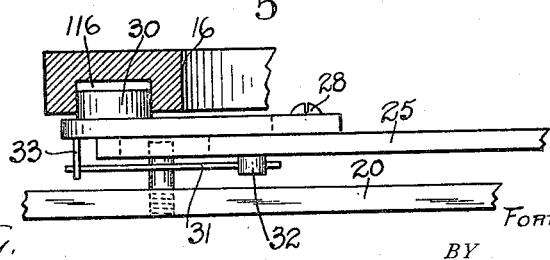
WITNESSES:
A H Edgerton
O. M. McLaughlin
INVENTOR.
Forrest M. Wilson.
BY
V. H. Lockwood,
ATTORNEY.
COLUMBIA PLANOGRAPH CO., WASHINGTON, D. C.

UNITED STATES PATENT OFFICE.

FORREST M. WILSON, OF ANDERSON, INDIANA, ASSIGNOR TO COMPUTING CHEESE CUTTER COMPANY, OF ANDERSON, INDIANA, A CORPORATION.

CHEESE-CUTTER.

1,160,026.  Specification of Letters Patent.  Patented Nov. 9, 1915.

Application filed December 16, 1912. Serial No. 737,081.

*To all whom it may concern:*

Be it known that I, FORREST M. WILSON, a citizen of the United States, and a resident of Anderson, county of Madison, and State of Indiana, have invented a certain new and useful Cheese-Cutter; and I do hereby declare that the following is a full, clear, and exact description thereof, reference being had to the accompanying drawings, in which like numerals refer to like parts.

The object of this invention is to improve the construction of cheese cutters so that the rotary cheese support will always start and stop exactly as intended. The means for actuating the rotary cheese support will always instantly engage the same for actuation, and the cheese support will always instantly stop when the actuating means stops and there will be no overthrow.

The chief feature of this invention consists in providing an annular groove in the rotary cheese support, and a friction means projecting into said groove so that when slightly oscillating in one direction, it will bite both side walls of the groove for actuating the cheese support. The advantage of this arrangement is that the two side walls of the groove of said cheese support are in absolutely constant fixed relation with each other and said friction means in the groove is adapted to wedge in between said walls during the actuating movement and, therefore, incidentally grip the same, and the greater the actuating force, the greater the frictional or biting engagement of said means with the side walls of the groove.

Another feature of the invention consists in providing a spring or the like for frictionally engaging the rotary cheese support substantially at the point where said cheese support is engaged by the means for actuating the same. This localizes the means for actuating and stopping or preventing the overthrow of the rotary cheese support at one point. Heretofore the actuating means and the means for stopping or preventing the overthrow of the rotary cheese support, have been located quite far apart, usually diametrically opposite each other so that they would not act at the same point on the cheese support, but between them there would be opportunity for play or loss of play or movement so that accuracy of the operation of the cheese cutter was impossible.

The nature of the invention will be understood from the accompanying drawings and the following description and claims.

In the drawings, Figure 1 is a perspective view of the cheese cutter. Fig. 2 is a central vertical section through the same. Fig. 3 is a horizontal section through a portion thereof on the line 3—3 of Fig. 2, parts being broken away and parts in dotted lines, and showing the friction pin and parts in non-actuating position. Fig. 4 shows a part of Fig. 3, with the friction pin and parts in actuating position. Fig. 5 is a bottom view of what appears in Fig. 3, with parts in section. Fig. 6 is a vertical section through a part of the device on the line 6—6 of Fig. 4.

In detail there is shown in the drawings, a cheese cutter provided with a base 10, a cheese board 11, a support 12, a knife handle 13 and a knife 14, all of customary form and constituting no novel part of this invention.

There is a cross bar 15 secured to the base and extending diametrically of the same in which the cheese supporting frame 16 is centrally pivoted by a pin 17 which has a reduced portion extending through a hole in said bar 15 and a washer 18, and screw 19 on the lower end thereof holds the parts in place so that the cheese support 16 can rotate, and upon this cheese support the cheese board 11 is secured. The cheese support 16 is a metallic skeleton frame having an annular portion and as many cross bars as desired to make up the frame. The annular portion of the cheese support has an annular groove 116 in its under side. Aside from the annular groove 116 on the under side of the cheese support, it is not novel or peculiar in construction and may be made in any other manner desired.

The means for rotating the cheese support, and therefore the cheese to the knife as the cheese is being cut, is as follows: An actuating lever 20 is fulcrumed at its inner end by a pin 21 to the base and lies under the cheese support and the free end of the lever projects through a horizontal slot 22 on the front side of the base and outward beyond the base to form a handle whereby it is manipulated. The actuating lever 20 has an upwardly extending pin 23 near its fulcrum which projects into a slot 24 longitudinal of a radial arm or bar 25 which is pivoted at its inner end on the pin 17 at the center of the cheese support.

Upon the other end of said radial arm a short plate 26 lies substantially parallel with the arm 25 and with its inner end provided with a longitudinal slot 27 through which a headed pin 28 from the arm 25 extends, the head of the pin holding the plate down on the arm 25, but permitting some radial and oscillatory movement of the plate 26. The other end of the plate 26 projects beyond the outer end of the radial arm 25 and has an upwardly extending friction pin 30 which projects into the annular groove 116 in the cheese support. This pin 30 is, as shown herein, elongated, so that the two ends thereof frictionally and simultaneously engage the two side walls of the groove 116. Instead of being elongated, as shown, said pin may be formed of two pins, each in position to engage one of the side walls of the groove, for the particular construction of said friction pin is not essential, although that shown is preferable. A spring 31 secured to the post 32 on the under side of the radial arm 25, engages a pin 33 extending down from the outer end of the plate 26 and presses said plate so as to cause the friction pin 30 to frictionally engage the inner side walls of the groove 116 in the cheese support and thus always cause said actuating means to grip the cheese support, without fail, when the lever is given a forward movement.

The movement of the plate 26 and friction pin 30 under the influence of the hand lever or spring 31, from the position shown in Fig. 3 to the position shown in Fig. 4, will cause the pin 30 to oscillate more and more across the groove until both of its ends grip the walls of the groove simultaneously, and, as it were, wedge in between said two walls to prevent any possible slippage. On the other hand, the opposite movement of the plate 26 will simultaneously disengage both ends of the pin 30 from both side walls of the groove in the cheese support. Therefore, as the lever is moved to the right, as shown in Fig. 1, the pin 23 will actuate the radial arm 25 and it will move the plate 26 and friction pin 30 laterally and the frictional engagement of the pin 30 with the side walls of the groove of the cheese support, will cause a rotary movement of the cheese in proportion to the actuation of the lever.

In the foregoing operation the pinching of the friction pin 30 results from the movement of the inner end of the plate 26 by the pin 28 in the direction of movement intended for the cheese support, see the arrow in Fig. 3, and as will be obvious from an inspection of Fig. 3, a left-hand movement of the inner end of the plate 26 will cause a corresponding disengagement of the friction pin 30. This result ensues because such movement of the inner end of the plate 26 in one direction tends to cause the pin 30 to oscillate crosswise of the groove, and the opposite movement of the inner end of the plate 26 tends to cause the pin to move longitudinally of the groove and disengage the cheese support. The center of oscillation of the plate 26 is the friction pin 30, but to cause the friction pin to always catch and operate, the slot 27 in plate 26 is provided so that plate 26 can readily accommodate itself longitudinally to any necessary variation of position to cause the friction pin 30 to bite the side walls of the groove in the cheese support when the inner end of said plate 26 is moved in the right direction.

Over the outer end of the actuating lever 20 there is a scale bar 40 upon which suitable graduations are provided to indicate the extent of movement which should be given to the handle of the lever in order to move the cheese far enough to cause a slice of a certain weight or value to be severed by the operation of the knife. There are weight graduations not shown on said scale bar and upon said scale bar there is a sliding stop 41 which can be adjusted at any numeral on said scale bar and the numeral at which it is adjusted will indicate the number of slices into which the cheese will be cut by the device. The lever is moved from the left to the right until it strikes stop 41 and then the knife is lowered upon the cheese so as to cut a slice therefrom. Before the next slice is cut, the actuating lever is thrown to the left against a stationary stop 42. There is no novelty in the scale bar or stop construction so far as this invention is concerned.

At the rear of the machine there is a flat spring 50 secured upon the top of the base by screws 51 so as to frictionally engage the upper surface of the metal cheese support 16 and at a point over the means heretofore described for actuating said cheese support. This spring prevents any overthrow due to the momentum of the cheese, when the lever is stopped and it is particularly effective when placed as herein shown because it is immediately over the means for actuating the cheese support, the point at which said actuating means engages the cheese support. Heretofore actuating means for engaging the cheese support has usually been at the other side of the machine, 180° away from said spring, so that there was more or less lost play or movement due to the remoteness of said parts to each other and, therefore, the cheese would not stop at exactly the point desired so that a larger slice would be severed than was intended. The cheese board is cut away at 52 on the under side, all around, in order to clear said spring 50.

It is thus seen that a positively actuated machine is provided which will start immediately without slippage and will stop immediately without overthrow. Heretofore machines have been constructed with friction pins engaging the outer wall of the annular portion of the cheese support, but in none has there been a friction pin operating in the groove so as to simultaneously grip and wedge in between the side walls of said groove or be operated by the means herein shown.

I claim as my invention:

1. A cheese cutter including a base, a rotary cheese support, means for engaging and actuating said cheese support, and a spring secured to the base and frictionally engaging said cheese support substantially at the point of engagement therewith of the means for actuating the cheese support.

2. A cheese cutter including a base, a rotary cheese support, means for engaging and actuating said cheese support, and a flat spring secured to said base and bearing down upon said cheese support over the point of engagement therewith of the means for actuating the cheese support.

3. A cheese cutter including a base, a rotary cheese support, an actuating lever mounted under the cheese support and pivoted at its rear end to the base, means actuated by said lever near its fulcrum and for engaging and actuating the cheese support, and a flat spring secured to said base and bearing down upon said cheese support substantially over the fulcrum of said lever.

In witness whereof, I have hereunto affixed my signature in the presence of the witnesses herein named.

FORREST M. WILSON.

Witnesses:
 J. H. WELLS,
 ORPHA M. McLAUGHLIN.

Copies of this patent may be obtained for five cents each, by addressing the "Commissioner of Patents, Washington, D. C."